United States Patent
Kraus et al.

(10) Patent No.: US 11,775,821 B2
(45) Date of Patent: Oct. 3, 2023

(54) METHOD FOR LEARNING FROM DATA WITH LABEL NOISE

(71) Applicant: Siemens Healthcare GmbH, Erlangen (DE)

(72) Inventors: Martin Kraus, Fuerth (DE); Florin-Cristian Ghesu, Princeton, NJ (US)

(73) Assignee: SIEMENS HEALTHCARE GMBH, Erlangen (DE)

( * ) Notice: Subject to any disclaimer, the term of this patent is extended or adjusted under 35 U.S.C. 154(b) by 755 days.

(21) Appl. No.: 16/884,140

(22) Filed: May 27, 2020

(65) Prior Publication Data

US 2020/0387786 A1 Dec. 10, 2020

(30) Foreign Application Priority Data

Jun. 7, 2019 (EP) .................................... 19178958

(51) Int. Cl.
*G06N 3/08* (2023.01)
*G06F 17/18* (2006.01)
*G06F 18/2431* (2023.01)

(52) U.S. Cl.
CPC ............... *G06N 3/08* (2013.01); *G06F 17/18* (2013.01); *G06F 18/2431* (2023.01)

(58) Field of Classification Search
CPC ........ G06N 3/08; G06F 17/18; G06F 18/2431
See application file for complete search history.

(56) References Cited

U.S. PATENT DOCUMENTS

2017/0293609 A1 10/2017 Seow et al.
2019/0114544 A1 4/2019 Sundaram et al.

OTHER PUBLICATIONS

Kostas, Hatalis et al: "Smooth Pinball Neural Network for Probabilistic Forecasting of Wind Power"; arxiv.org, Cornell University Library, 201 Olin Library Cornell University Ithaca, NY 14853; Oct. 4, 2017 (Oct. 4, 2017), XP080826137.
Wang, Ruxin et al. "Multiclass Learning With Partially Corrupted Labels", IEEE Transaction on Neutral Networks and Learning Systems, vol. 29, No. 6, pp. 2568-2580, Jun. 2018.
Guan, Donghai et al. "A Survey of Mislabeled Training Data Detection Techniques for Pattern Classification", IETE Technical Review, vol. 30, Nr. 6, pp. 524-530, 2013.
Sukhbaatar, S. et al. "Training convolutional networks with noisy labels", arXiv: 1406.2080, 2015.
Koenker, Roger et al. "Quantile Regression", Journal of Economic Perspectives, vol. 15, No. 4, pp. 143-156, 2001.
Onofrey, John A. et al. "Generalizable Multi-Site Training and Testing of Deep Neural Networks Using Image Normalization" IEEE 16th International Symposium on Biomedical Imaging (ISBI 2019), pp. 348-351, Apr. 8-11, 2019 // DOI: 10.1109/ISBI.2019.8759295.

(Continued)

*Primary Examiner* — Reginald A Renwick
(74) *Attorney, Agent, or Firm* — Harness, Dickey & Pierce, P.L.C.

(57) ABSTRACT

A method and a system are for performing at least one inference task on medical input data. In an embodiment, the system includes: a computing device configured to implement an artificial neural network, ANN. The ANN is configured to receive medical input data as an input and to perform at least one inference task based on the medical input data. The ANN includes an output layer with, for at least one inference task of the at least one inference task, a plurality of output nodes. Each output node corresponds to one quantile out of a plurality of defined quantiles.

24 Claims, 3 Drawing Sheets

(56) References Cited

OTHER PUBLICATIONS

Zheng, Yaling et al. "Active Learning from Multiple Noisy Labelers with Varied Costs", IEEE International Conference on Data Mining, pp. 639-648, 2010.
Reed, Scott E. et al. "Training Deep Neural Networks on Noisy Labels With Bootstrapping", workshop contribution at ICLR 2015 // arXiv:1412.6596 [cs.CV] (Submitted on Dec. 20, 2014).
Lehtinen, J et al. "Noise2Noise: Learning Image Restoration without Clean Data"; Proceedings of the 35 th International Conference on Machine Learning, 2018;.

METHOD FOR LEARNING FROM DATA WITH LABEL NOISE

PRIORITY STATEMENT

The present application hereby claims priority under 35 U.S.C. § 119 to European patent application number EP 19178958.5 filed Jun. 7, 2019, the entire contents of which are hereby incorporated herein by reference.

FIELD

Embodiments of the invention generally relate to a method for learning from data with label noise.

BACKGROUND

In the field of artificial intelligence, in particular of machine learning, labels play an important role as the basis for supervised learning. Labels associate training examples of a training data set with respective ground truths. Then, an artificial neural network can be trained to minimize an error of its predictions (or: inferences), when taking one of the training examples as input, compared to the ground truth (or label) for the same training example.

Labelled training data are an important and valuable resource in machine learning, and lack of sufficient training data is often one of the main obstacles for a specific machine learning project. Procuring labelled training data is, on the other hand, often comparatively expensive, as for example for image classification human labelers have to be employed to label images. Although some image classification tasks are relatively easy for humans, mistakes may be made when labelling, for example due to carelessness, lack of concentration, lack of knowledge. Other image classification tasks, in particular in the medical domain, are very complex and highly dependent on e.g. a physician's experience and sometimes intuition.

In this context, label noise is a common problem. Label noise means that the labelling for a certain training example may not be consistent over the whole training data set, or that labels for different training examples may be mutually contradictive or exclusive. This makes it difficult to use training data sets with high label noise for training artificial neural networks, as the corresponding cost or loss function will in some cases penalize a correct inference and/or reward a wrong inference.

For example, radiologists may provide labels (e.g. segmentation masks, scores, boundary equations and/or the like) for a given set of images. Due to their different experience, problem difficulty, lack of attention or other random effects, two raters might differ in their opinion ("inter-rater variability"), thus labelling the same image (or: training example) differently, leading to label noise. Another example is if a single rater labels similar examples differently, or labels one and the same example different at different points in time ("intra-rater variability").

Usually, the amount of label noise increases for harder problems, in particular for harder examples of a given problem. In the most general case, label noise can be seen as uncertainty or inconsistency of labels of data, regardless of its origin.

Conventional machine learning systems, models and algorithms can be negatively affected when learning from inconsistent and/or conflicting labels and therefore might produce suboptimal results that are difficult to interpret or have a lower trust rating.

One attempt in the prior art to cope with label noise can be found e.g. in the scientific publication by Wang et al.: "Multiclass learning with partially corrupted labels", "IEEE transactions on neural networks and learning systems 29.6 (2018):2568-2580.

SUMMARY

In addition, conventional machine learning systems, models and algorithms often provide answers for inference tasks, but the inventors have discovered that they cannot give their users a sense of how these answers have been reached or how confident the system is in these answers. This negatively impacts, or in the worst case eliminates, the usability of the systems as in many cases it is desired to have a reasoned answer or at least an answer that gives a user an idea of how accurate the answer is.

At least one embodiment of the present invention provides a system for performing at least one inference task on medical input data that is more robust against noisy input data and which gives more insight into its results for inference tasks, as well as to provide a corresponding method and a method for training such as system.

Therefore, according to a first embodiment of the present invention, a system for performing at least one inference task on medical input data is provided, comprising:

a computing device configured to implement an artificial neural network, ANN;

wherein the ANN is configured to receive medical input data as its input and to perform at least one inference task based on the medical input data; and wherein the ANN comprises an output layer with, for at least one inference task of the at least one inference task, a plurality of output nodes, wherein each output node of said plurality corresponds to one quantile out of a plurality of pre-defined quantiles (for the corresponding inference task).

The invention also provides, according to a second embodiment, a computer-implemented method for performing at least one inference task on medical input data, comprising at least:

inputting medical input data into an artificial neural network, ANN, wherein the ANN is configured to receive medical input data as its input and to perform at least one inference task based on the medical input data;

processing the medical input data by the ANN; and outputting, by the artificial neural network, for at least one inference task of the at least one inference task, an output value corresponding to each quantile out of a plurality of pre-defined quantiles.

The invention further provides, according to a third embodiment, a computer-implemented method for training an artificial neural network for at least one inference task on medical input data, comprising at least:

providing an ANN configured to receive medical input data as its input and to perform at least one inference task based on the medical input data;

wherein the ANN comprises an output layer with, for at least one inference task of the at least one inference task, a plurality of output nodes, wherein each output node of said plurality corresponds to one quantile out of a plurality of pre-defined quantiles; and training the artificial neural network with labelled training data and using a cost function which comprises an individual loss term for each of the pre-defined quantiles.

The invention also provides, according to a fourth embodiment, a system for training an artificial neural network for at least one inference task on medical input data, comprising a computing device configured to perform the method according to any embodiment, including but not limited to the third embodiment.

The system according to the fourth embodiment is in particular configured to train an artificial neural network for use in any embodiment of the system according to the first embodiment and/or in any embodiment of the method according to, but not limited to the second embodiment of the present invention.

The invention further provides, according to a fifth embodiment, a non-transitory computer-readable data storage medium comprising executable program code configured to, when executed by a computing device, perform the method according to any embodiment, including but not limited to the second embodiment.

The invention also provides, according to a sixth embodiment, a computer program product comprising executable program code configured to, when executed by a computing device, perform the method according to any embodiment, including but not limited to the second embodiment.

The invention further provides, according to a seventh embodiment, a non-transitory computer-readable data storage medium comprising executable program code configured to, when executed by a computing device, perform the method according to any embodiment, including but not limited to the third embodiment.

The invention also provides, according to an eight embodiment, a computer program product comprising executable program code configured to, when executed by a computing device, perform the method according to any embodiment, including but not limited to the third embodiment.

At least one embodiment of the invention provides a system for performing at least one inference task on medical input data, comprising:
  a computing device, configured to implement an artificial neural network (ANN), the ANN being configured to
    receive medical input data as an input, and
    perform the at least one inference task based on the medical input data received; and
  wherein the ANN comprises an output layer including, for at least one inference task of the at least one inference task, a plurality of output nodes, and
  wherein each output node of the plurality of output nodes, corresponds to one quantile out of a plurality of defined quantiles.

At least one embodiment of the invention provides a computer-implemented method for performing at least one inference task on medical input data, comprising:
  inputting medical input data into an artificial neural network (ANN), the ANN being configured to
    receive medical input data as an input, and perform at least one inference task based on the medical input data received;
  processing the medical input data by the ANN; and
  outputting by the ANN, for each at least one inference task of the at least one inference task, an output value respectively corresponding to each quantile of a plurality of defined quantiles.

At least one embodiment of the invention provides a computer-implemented method for training an artificial neural network (ANN) for at least one inference task on medical input data, comprising:
  providing an ANN, configured to
    receive medical input data as an input and
    perform at least one inference task based on the medical input data;
  wherein the ANN includes an output layer with, for at least one inference task of the at least one inference task, a plurality of output nodes, and wherein each output node of the plurality of output nodes corresponds to one quantile out of a plurality of defined quantiles; and
  training the ANN with labelled training data and using a cost function, including an individual loss term, for each of the defined quantiles.

At least one embodiment of the invention provides a non-transitory computer-readable data storage medium storing executable program code configured to, when executed by a computing device, perform an embodiment of the method.

BRIEF DESCRIPTION OF THE DRAWINGS

The accompanying drawings are included to provide a further understanding of the present invention are incorporated in and constitute a part of the specification. The drawings illustrate the embodiments of the present invention and together with the description serve to illustrate the principles of the invention. Other embodiments of the present invention and many of the intended advantages of the present invention will be readily appreciated as they become better understood by reference to the following detailed description. Like reference numerals designate corresponding similar parts.

The numbering of method steps is intended to facilitate understanding and should not be construed, unless explicitly stated otherwise, or implicitly clear, to mean that the designated steps have to be performed according to the numbering of their reference signs. In particular, several or even all of the method steps may be performed simultaneously, in an over-lapping way or sequentially.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central At least one processor (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central At least one processor (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer at least one processors into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Therefore, according to a first embodiment of the present invention, a system for performing at least one inference task on medical input data is provided, comprising:

a computing device configured to implement an artificial neural network, ANN;

wherein the ANN is configured to receive medical input data as its input and to perform at least one inference task based on the medical input data; and wherein the ANN comprises an output layer with, for at least one inference task of the at least one inference task, a plurality of output nodes, wherein each output node of said plurality corresponds to one quantile out of a plurality of pre-defined quantiles (for the corresponding inference task).

In order to facilitate understanding, in the present text, when we discuss a quantile (or percentile), we are talking about the abstract quantity itself, not of its value. The value itself will mostly be designated as "output value corresponding to the quantile", or alternatively as "value of the quantile". For example, it may be stated that for a certain inference task, an output node corresponding to the 30th percentile is provided, and that the output value of the output node corresponding to that 30th percentile is 0.2, meaning that 30% of a distribution are smaller or equal to 0.2. Our terminology is therefore slightly different from other terminologies such as "The 30th percentile of that distribution is 0.2".

When herein different quantiles are referred to (e.g. "first quantile", "second quantile"), this is supposed to be understood to mean quantiles of the same type, i.e. all are x-quantiles, x being a natural number. For example, the two 2-quantiles, the three 3-quantiles, the four 4-quantiles, . . . , the 100-quantiles ("percentiles") and so on.

In general, the artificial neural network may be configured to receive a tensor as an input and to output at least one tensor as the result of the at least one inference task. The tensor may in particular be a matrix or a vector.

Alternatively or additionally, the artificial neural network may be configured to receive an image as an input and to output at least one image as the result of the at least one inference task. Alternatively or additionally, the artificial neural network may be configured to receive an image as an input and to output at least one class as the result of the at least one inference task (i.e. at least one inference task may be a classification task).

In statistics and probability quantiles are cut points dividing the range of a probability distribution into continuous intervals with equal probabilities, or dividing the observations in a sample in the same way. One example of quantiles are percentiles (100-quantiles).

A percentile (or a centile) is a measure used in statistics indicating the value below which a given percentage of observations in a group of observations falls. For example, the 20th percentile is the value (or score) below which 20% of the observations may be found. The 0th percentile is usually defined as the lowest value of the distribution, and the 100th percentile as its highest value.

A well-known quantile is the median, which may also be designated as the 2-quantile or as the 50th percentile. The median is a value for a distribution which separates the distribution into two equally-sized groups, or, in other words: the median is defined such that half the values of the distribution are smaller than the median and half are larger than the median. The same applies in analogy to the other quantiles and percentiles. For example, the 20th percentile (or: first 5-quantile) is a value defined such that 20% of the values of a distribution are smaller than said value.

By providing outputs that relate to quantiles, a user of the system of the present invention is provided with additional information about the internal state of the system in the sense that the user understands better with which degree of certainty one of the output results is output.

For example, a conventional system may receive a medical scan image as input and may output, after classification by an artificial neural network, an object within the scan image as a tumor. This is one type of output result. Other output results may e.g. comprise a vector giving coordinates of a bounding box for the tumor, the dimensions of the bounding box, and so on.

With at least one embodiment of the present invention, now each of a plurality of inference tasks (for example, the object classification labels for each classified and/or detected object) are not only represented, or solved, by a single output node, but by a plurality of output nodes, of the same number as the plurality of pre-defined quantiles. For example, if the 15th, the 30th, the 50th, the 70th and the 85th percentile were the pre-defined quantiles, then five output nodes would represent each of the chosen inference tasks.

Instead of simply receiving, as in conventional systems, a single value as the result of an inference task (for example, an average value), the user of the system described herein obtains the output of the output nodes corresponding to each of the pre-defined quantiles and can therefore better judge the meaning and reliability of the result as well as the internal state of the artificial neural network.

One of the key advantages of at least one embodiment of the present invention is that uncertainty in labels can be dealt with by learning based on noisy targets and custom loss functions. Then the trained model outputs quantiles (preferably percentiles) that can be interpreted as corresponding to the behavior of a set of virtual voters. Interpreted in another way, the output values corresponding to the different quantiles are a probability map giving an indication of the confidence of the system in its own output.

A quantile (or percentile) at which a certain output value of an inference task changes from zero to a non-zero value (e.g. to one) may, for example, be used as an indication of the reliability of an image segmentation. For example, when the output value corresponding to the 50th percentile is 0, and the output value for the 60th percentile and onwards is 1, this indicates that the "votes" on this particular inference task are divided 50/50. The system may be configured to output a warning signal to its user when a change in output values larger than a pre-defined threshold appears in a certain range, or over a certain pre-defined threshold, of quantiles. The warning signal may be visually output by a visual output device of the system (e.g. output by a display of the system as text or symbols, or by an LED of the system), acoustically output by an acoustic output device of the system (such as a spoken warning message or a sound signal output by a loudspeaker or headphone of the system) or haptically output by a haptic output device of the system (e.g. a vibration by a vibrator).

For example in the above case with the 50/50 division, the warning signal may prompt the user (e.g. a physician) to disregard the output of this particular inference task, or to provide additional data, or to seek other confirmation or corroboration and/or the like.

In the case of segmentation tasks in particular, the output values corresponding to different quantiles can be indicated as such visually. Note that each segment to be identified in a particular segmentation task may be characterized as one separate inference task in the present application.

In general, at least one embodiment of the present invention allows a natural handling of inconsistency or noise in labels, and therefore makes the generation of labelled training examples easier and eventually cheaper. In particular, the present invention allows using multiple raters to label training examples without the need for the raters to concur on each label, and without the need for the number of raters to be the same for each training example.

The computing device may be realized in hardware, such as a circuit or a printed circuit board and/or comprising transistors, logic gates and other circuitry. Additionally, the computing device may be at least partially realized in terms of software. Accordingly, the computing device may comprise a processor (such as at least one CPU and/or at least one GPU) and a memory storing a software or a firmware that is executed by the processor to perform the functions of the computing device.

The computing device may also be realized as a cloud computing platform.

In systems based on cloud computing technology, a large number of devices is connected to a cloud computing system via the Internet. The devices may be located in a remote facility connected to the cloud computing system. For example, the devices can comprise, or consist of, equipments, sensors, actuators, robots, and/or machinery in an industrial set-up(s). The devices can be medical devices and equipments in a healthcare unit. The devices can be home appliances or office appliances in a residential/commercial establishment.

The cloud computing system may enable remote configuring, monitoring, controlling, and maintaining connected devices (also commonly known as 'assets'). Also, the cloud computing system may facilitate storing large amounts of data periodically gathered from the devices, analyzing the large amounts of data, and providing insights (e.g., Key Performance Indicators, Outliers) and alerts to operators, field engineers or owners of the devices via a graphical user interface (e.g., of web applications). The insights and alerts may enable controlling and maintaining the devices, leading to efficient and fail-safe operation of the devices. The cloud computing system may also enable modifying parameters associated with the devices and issues control commands via the graphical user interface based on the insights and alerts.

The cloud computing system may comprise a plurality of servers or processors (also known as 'cloud infrastructure'), which are geographical distributed, connected with each other via a network. A dedicated platform (hereinafter referred to as 'cloud computing platform') is installed on the servers/processors for providing above functionality as a service (hereinafter referred to as 'cloud service'). The cloud computing platform may comprise a plurality of software programs executed on one or more servers or processors of the cloud computing system to enable delivery of the requested service to the devices and its users.

One or more application programming interfaces (APIs) are deployed in the cloud computing system to deliver various cloud services to the users.

Further advantageous embodiments, variants, options and modifications are apparent from the dependent claims for each of the embodiments of the invention as well as from the description in combination with the figures.

In some advantageous embodiments, variants, or refinements of embodiments, the ANN comprises an output layer which comprises one respective output node corresponding to each quantile out of the plurality of pre-defined quantiles for each inference task. For example, if a number of k quantiles are pre-defined and there is a number of m inference tasks, then the output layer comprises at least k*m output nodes. In this way, a user of the system obtains insight into the internal state of the system regarding its reliability for each of the inference tasks.

The number of quantiles for each inference task may be different in some cases, or, in other words, the number of quantiles for at least one inference task may be different from the number of quantiles for at least one other inference task. For example, one inference task may be solved by the results, or output values, of five output nodes, corresponding e.g. to the 15th, 30th, 50th, 70th, and 85th percentile, respectively. Another inference task may be solved by the results, or output values, of only four output nodes, corresponding e.g. to the first, second, third and fourth quartile (4-quantile), respectively. In this way, the desired number of quantiles can be directly tailored to the nature and the requirements of each inference task.

In some advantageous embodiments, variants, or refinements of embodiments, the artificial neural network is configured to receive medical imaging data as the medical input data, and at least one inference task comprises classification of features of the medical imaging data into at least one of a plurality of classes. The features to be classified may e.g. by pixels of the medical imaging data. The classification may comprise segmentation. For example, the task may comprise to classify for each pixel of the medical imaging data whether it belongs to the background or to an object out of a list of at least one objects, such as to classify for each pixel whether it belongs to a human spine or not.

Other inference tasks may comprise object detection, object localization and/or the like.

In some advantageous embodiments, variants, or refinements of embodiments, the quantiles are percentiles. Percentiles are an intuitive way to present estimates of reliability for the result of an inference task.

In some advantageous embodiments, variants, or refinements of embodiments, the system and/or the artificial neural network of the system is configured to output at least one output image. In particular, the system may receive images as its input ("input images") and may then provide at least one output image as its output. Output values of output nodes corresponding to different quantiles for the same inference task may be indicated differently in said at least one output image. For example, in a task to classify pixels as to whether they belong to a specific object (e.g. to a specific organ), pixels in the output image may be colored different corresponding to which percentile of virtual raters would rate the corresponding pixel to belong to said specific object. For instance, red (or a first pattern) may indicate that over 90% of virtual raters agree that that pixel belongs to the object, yellow (or a second pattern) may indicate that 50% of virtual raters would say so and green (or a third pattern) may indicate that only 10% of virtual raters would say so.

The invention also provides, according to a second embodiment, a computer-implemented method for performing at least one inference task on medical input data, comprising at least:

inputting medical input data into an artificial neural network, ANN, wherein the ANN is configured to receive medical input data as its input and to perform at least one inference task based on the medical input data;

processing the medical input data by the ANN; and outputting, by the artificial neural network, for at least one inference task of the at least one inference task, an output value corresponding to each quantile out of a plurality of pre-defined quantiles.

In some advantageous embodiments, variants, or refinements of embodiments of the method, an output value corresponding to each quantile out of the plurality of pre-defined quantiles is output for each inference task.

In some advantageous embodiments, variants, or refinements of embodiments of the method, medical imaging data are input as the medical input data, and at least one inference task comprises classification of features of the medical imaging data into at least one of a plurality of classes.

In some advantageous embodiments, variants, or refinements of embodiments of the method, the quantiles are percentiles.

The invention further provides, according to a third embodiment, a computer-implemented method for training an artificial neural network for at least one inference task on medical input data, comprising at least:

providing an ANN configured to receive medical input data as its input and to perform at least one inference task based on the medical input data;

wherein the ANN comprises an output layer with, for at least one inference task of the at least one inference task, a plurality of output nodes, wherein each output node of said plurality corresponds to one quantile out of a plurality of pre-defined quantiles; and training the artificial neural network with labelled training data and using a cost function which comprises an individual loss term for each of the pre-defined quantiles.

The method according to the third embodiment is in particular configured to train an artificial neural network for use in any embodiment of the system according to the first embodiment and/or in any embodiment of the method according to the second embodiment of the present invention.

In some advantageous embodiments, variants, or refinements of embodiments of the training method, the individual loss terms utilize a weighted L1 norm.

In some advantageous embodiments, variants, or refinements of embodiments, the cost function comprises a weighted sum over the individual loss terms. In this way the training can be performed such that quantiles (or percentiles) that are the most important, or most meaningful, for a specific inference task, have a greater influence during training so that the trained artificial neural network will better learn to get those quantiles right.

In some advantageous embodiments, variants, or refinements of embodiments of the training method, the cost function penalizes when an output node corresponding to a (comparatively) higher quantile outputs a value that is lower than an output node corresponding to a (comparatively) lower quantile for the same inference task. In other words, the cost function penalizes when an output node corresponding to a first quantile outputs a value that is lower than an output node corresponding to a second quantile for the same inference task when the second quantile is lower than the first quantile, in the sense that the i-th x-quantile is smaller than the (i+1)-th x-quantile (e.g. the first 4-quantile, or quartile, is smaller than the second quartile) and the j-th percentile is smaller than the (j+1)-th percentile. Thus, another way to put it is that for each i-th quantile within the pre-defined quantiles, the cost function penalizes when an output node corresponding to that i-th quantile outputs a value that is lower than an output node for a j-th quantile of the pre-defined quantiles when j<i.

Such a cost formula makes use of the known properties of quantiles to help training the artificial neural network faster and more accurately.

The invention also provides, according to a fourth embodiment, a system for training an artificial neural network for at least one inference task on medical input data, comprising a computing device configured to perform the method according to any embodiment, including but not limited to the third embodiment.

The system according to the fourth embodiment is in particular configured to train an artificial neural network for use in any embodiment of the system according to the first embodiment and/or in any embodiment of the method according to, but not limited to the second embodiment of the present invention.

The invention further provides, according to a fifth embodiment, a non-transitory computer-readable data storage medium comprising executable program code configured to, when executed by a computing device, perform the method according to any embodiment, including but not limited to the second embodiment.

The invention also provides, according to a sixth embodiment, a computer program product comprising executable program code configured to, when executed by a computing device, perform the method according to any embodiment, including but not limited to the second embodiment.

The invention further provides, according to a seventh embodiment, a non-transitory computer-readable data storage medium comprising executable program code configured to, when executed by a computing device, perform the method according to any embodiment, including but not limited to the third embodiment.

The invention also provides, according to an eight embodiment, a computer program product comprising executable program code configured to, when executed by a computing device, perform the method according to any embodiment, including but not limited to the third embodiment.

The invention will be explained in yet greater detail with reference to example embodiments depicted in the drawings as appended.

Although specific embodiments have been illustrated and described herein, it will be appreciated by those of ordinary skill in the art that the variety of alternate and/or equivalent implementations may be substituted for the specific embodiments shown and described without departing from the scope of the present invention. Generally, this application is intended to cover any adaptations or variations of the specific embodiments discussed herein.

Figure 1:
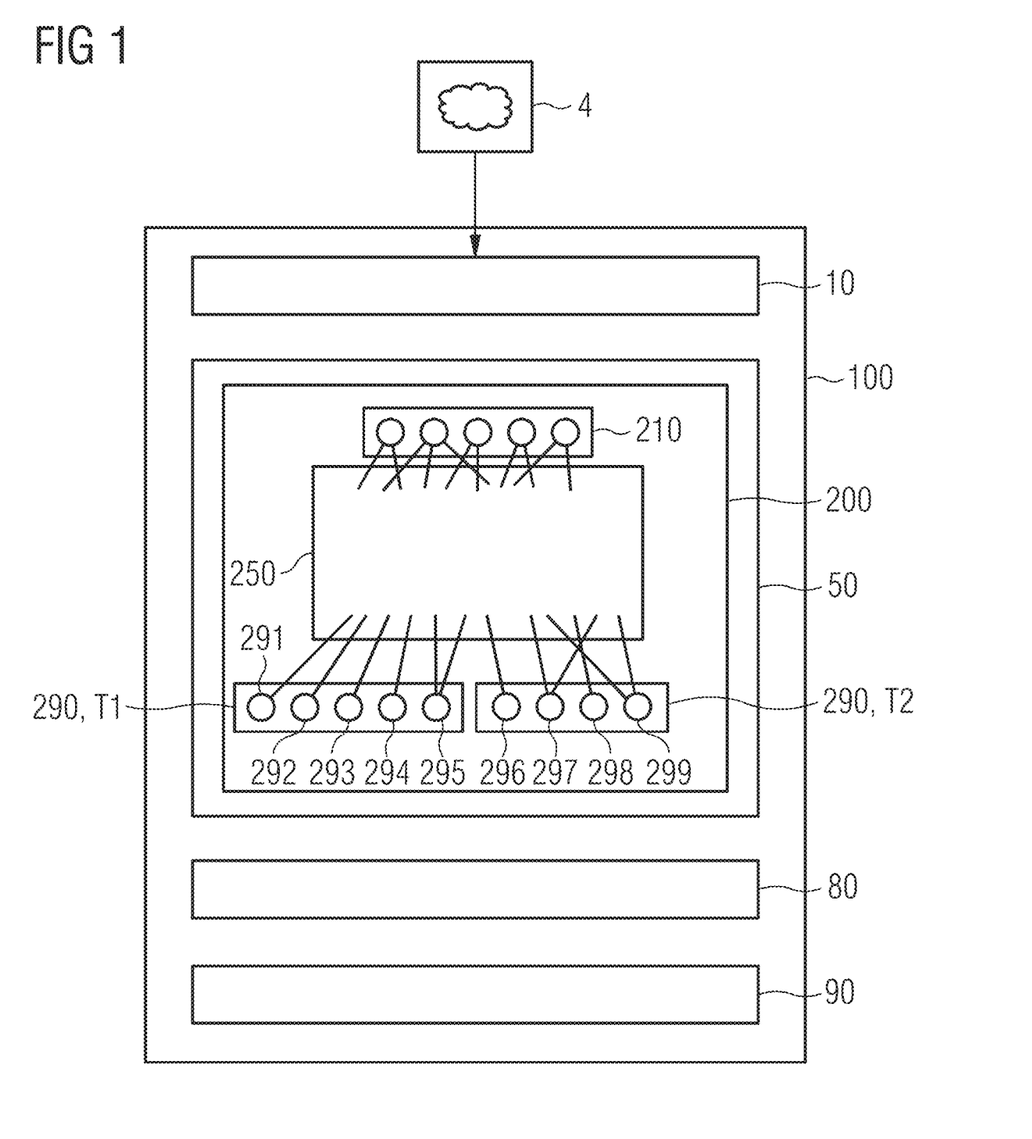
FIG. 1 shows a schematic block diagram of a system according to a first embodiment of the present invention.

FIG. 1 shows a schematic block diagram of a system 100 for performing at least one inference task on medical input data according to a first embodiment of the present invention.

The system 100 comprises at least one input interface 10 and a computing device 50, and may also comprise one or more output interfaces 90.

The computing device 50 may be realized in hardware, such as a circuit or a printed circuit board and/or comprising transistors, logic gates and other circuitry. Additionally, the computing device 50 may be at least partially realized in terms of software. Accordingly, the computing device 50 may comprise a processor (such as at least one CPU and/or at least one GPU) and a memory storing a software or a firmware that is executed by the processor to perform the functions of the computing device. The computing device 50 may also be, partially or completely, implemented as a cloud computing platform.

The computing device is operatively connected to the input interface 10 so as to receive signals from outside the system 100, and is also operatively connected to the output interface 90 so as to output signals out of the system 100. The input interface 10 and/or the output interface 90 may be realized as hardware and/or software, as physical connections and/or wireless connections according to any method known in the art.

The computing device 50 is configured to implement an artificial neural network 200. The artificial neural network 200 comprises an input layer 210, an output layer 290 and at least one hidden layer 250 in between. In particular, the artificial neural network 200 may comprise at least one convolutional layer. Any other known type of layer, of block of layer, method of connections between layers (such as drop-out, fully-connected etc.) known in the art may be employed.

In FIG. 1, the open nature of the architecture of the artificial neural network 200 between the input layer 210 and the output layer 290 is schematically illustrated by a box signifying the at least one hidden layer 250. The input layer 210 is shown exemplarily with 5 input nodes but it should be understood that in practice the number of input nodes will be much larger. For example, one input node for each pixel of a medical imaging data file (such as a MRT or CT or PET scan image) may be provided in the input layer 210. Only a few of the connections between the input layer 210 and the at least one hidden layer 250, and between the at least one hidden layer 250 and the output layer 290 are shown for reasons of clarity.

The artificial neural network 200 is configured to receive medical input data as its input and to perform at least one inference task based on the received medical input data, or, in other words, the artificial neural network 200 is configured to process received medical input data so as to generate a result of at least one inference task based thereon. FIG. 1 exemplarily shows an input image 4 being used as the medical input data. The input image 4 may be the result of a medical imaging process, such as an MRT scan, a CT scan, an X-ray scan, a PET scan, an ultrasound scan and/or the like.

The at least one inference task may e.g. be a classification task, a localization task, a detection task and/or the like. The same artificial neural network 200 may be configured to perform more than on inference task, of the same and/or of different types. The artificial neural network 200 may be configured to receive any type of tensor (e.g. a matrix or a vector) as input and to output any type of tensor as its output, wherein different channels of the output may correspond to different inference tasks.

The output layer 290 comprises at least one output node 291, 292, . . . , 299 for each inference task. In addition, the output layer 290 comprises for at least one inference task of the at least one inference task a plurality of output nodes 291, . . . , 299, wherein each output node 291, . . . 299 corresponds to one quantile out of a plurality of pre-defined quantiles for that specific inference task. Preferably, for each inference task there is a corresponding plurality of output nodes 291, . . . , 299 corresponding to a plurality of pre-defined quantiles for that specific inference task.

As an example, the artificial neural network 200 is shown in FIG. 1 to be configured to generate results for two inference tasks T1, T2. The first inference task T1 is exemplarily solved by five output nodes 291, . . . , 295, wherein each corresponds to a different quantile of the first inference task T1. For example, the output value of the first output node 291 may correspond to the 15th percentile of the first inference task T1, the output value of the second output node 292 may correspond to the 30th percentile of the first inference task T1, the output value of the third output node 293 may correspond to the 50th percentile of the first inference task T1, the output value of the fourth output node 294 may correspond to the 70th percentile of the first inference task T1 and the output value of the fifth output node 295 may correspond to the 85th percentile of the first inference task T1. In other words, percentiles 15, 30, 50, 70 and 85 have been pre-defined for the first inference task T1.

Further in FIG. 1, the second inference task T2 is exemplarily solved by four output nodes 296, . . . , 299, wherein each corresponds to a different 4-quantile (or: "quartile"). For example, the output value of the sixth output node 296 may correspond to the first quartile of the second inference task T2, the output value of the seventh output node 297 may correspond to the second quartile of the second inference task T2, the output value of the eight output node 298 may correspond to the third quartile of the second inference task T2, and the output value of the ninth output node 299 may correspond to the fourth quartile of the second inference task T2.

As has been described in the foregoing, the output layer 290 may be configured to so as to generate images with different answers to a specific inference task T1, T2 marked in different colors or different patterns.

Figure 2:
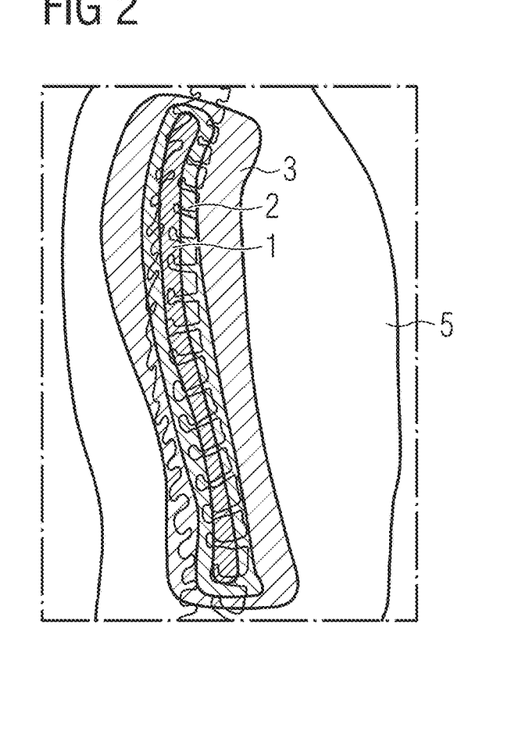
FIG. 2 schematically illustrates a possible result of the system of FIG. 1.

FIG. 2 schematically illustrates a medical image showing a magnetic resonance, MR, cross-section of a human torso. The example inference task here is to mark the human spine therein (or, in other words, to provide a segmentation mask identifying the human spine against the background). Three different segments 1, 2, 3 have been marked therein, corresponding to outputs of three output nodes corresponding to three different quantiles.

For example, the innermost segment 1 may correspond to the results of an output node corresponding to the 90th percentile, i.e. 90% of "virtual raters" agree that these pixels belong to the spine, i.e. solve the given inference task of finding pixels that belong to the spine. The middle segment 2 may correspond to the results of an output node corresponding to the 50th percentile, i.e. 50% of "virtual raters" agree that these pixels belong to the spine. The 50th percentile is the median; in other words, half the virtual raters rate that these pixels belong to the spine, while the other half rates these pixels as "background". The outermost segment 3 may correspond to the results of an output node corresponding to the 10th percentile, i.e. only 10% of "virtual raters" rate that these pixels belong to the spine.

Thus, the user of the system 100 is provided in this example with a clear indication of how reliable, or accurate, the ratings for the different pixels in the X-ray image are, and can act accordingly.

The system 100 may comprise a display 80 (such as a computer monitor, a touch screen, a mobile device screen and/or the like) configured to display to the user the output images with the results of the different quantiles for at least one inference task marked therein visually (or: graphically). Another software module, implementing an algorithm and/or another artificial neural network, may be arranged between the output layer 290 and the display 80 for generating the input of the display 80.

Figure 3:
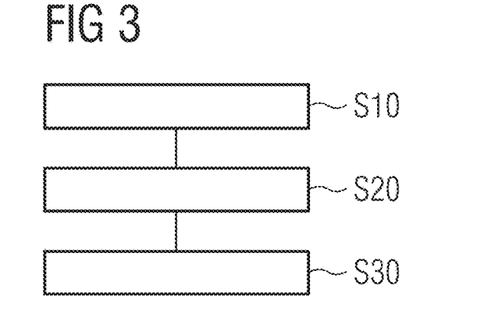
FIG. 3 shows a schematic flow diagram illustrating a method according to a second embodiment of the present invention.

FIG. 3 shows a schematic flow diagram illustrating a method according to an aspect of the first embodiment of the present invention.

FIG. 2 shows a schematic flow diagram illustrating a computer-implemented method for performing at least one inference task on medical input data according to a second embodiment of the present invention.

The method according to FIG. 2 may be performed by the system 100 of FIG. 1 and may be adapted and modified according to all variations, options and refinements that are described with respect to the system 100 of FIG. 1 and vice versa.

In a step S10, medical input data, such as at least one medical imaging data file (or: medical scan image) are input into an artificial neural network which is configured to receive medical input data as its input and to perform at least one inference task based on the medical input data. Specifically, this artificial neural network may be the artificial neural network 200 as has been described in the foregoing with respect to FIG. 1.

In a step S20, the medical input data are processed by the artificial neural network 200, e.g. as has been described in the foregoing with respect to FIG. 1.

In a step S30, for at least one inference task T1, T2 of the at least one inference task T1, T2, an output value corresponding to each quantile out of a plurality of pre-defined quantiles is output by the artificial neural network 200. Preferably, as depicted schematically in FIG. 1, an output value corresponding to each quantile out of a plurality of pre-defined quantiles is output by the artificial neural network 200 for each inference task T1, T2 solved by the artificial neural network 200.

The outputting S30 of the output values may be performed by an output interface 90 of a system 100 that comprises a computing device 50 implementing the artificial neural network 200 and/or graphically (or visually) by a display 80 as has been described in the foregoing.

Figure 4:
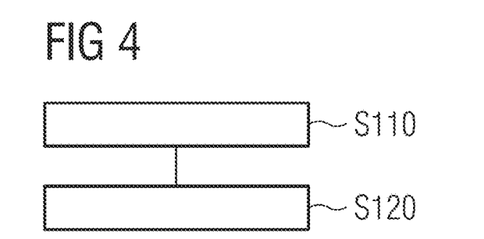
FIG. 4 shows a schematic flow diagram illustrating a method according to a third embodiment of the present invention.

FIG. 4 shows a schematic flow diagram illustrating a method according to the third embodiment of the present invention, i.e. a method for training an artificial neural network for at least one inference task on medical input data.

The method of FIG. 4 is in particular configured to train an artificial neural network for use in any embodiment of the system, including but not limited to the first embodiment and/or in any embodiment of the method including, but not limited to the second embodiment of the present invention. As such, the method of FIG. 4 may be adapted and modified according to all variations, options and refinements that are described with respect to the system 100 of FIG. 1 (or the method of FIG. 3) and vice versa.

According to FIG. 4, in a step S110, an artificial neural network 200 is provided which is configured to receive medical input data as its input and to perform at least one inference task T1, T2 based on the medical input data, wherein the artificial neural network 200 comprises an output layer 290 with, for at least one inference task T1, T2 of the at least one inference task T1, T2, a plurality of output nodes 291, . . . 299, wherein each output node 291, . . . , 299 corresponds to one quantile out of a plurality of pre-defined quantiles.

In a step S120, said provided artificial neural network 200 is trained with labelled training data and using a cost function which comprises an individual loss term for each of the pre-defined quantiles.

Preferably, the individual loss terms utilize a weighted L1 norm. The cost function may comprise a weighted sum over the individual loss terms. Also preferably, the cost function penalizes when an output node corresponding to a higher quantile outputs a value that is lower than an output node corresponding to a lower quantile for the same inference task.

For example, the individual loss term $Lq_k$ for a specific quantile k may be given by:

$$Lq_k = a_k * xi, \text{ if } xi \geq 0, \text{ and}$$

$$Lq_k = (a_k - 1) * xi, \text{ if } xi < 0,$$

wherein $x_i$ is the difference between a label $y_i$ and a predicted value, and wherein $a_k$ is a constant chosen for each quantile k. the total cost function for the training in step S120 may be a normalized sum over the loss individual loss terms $Lq_k$, or it may be a normalized weighted sum.

In Python (registered trademark) pseudo-code, the individual loss term Lqk (or: quantile loss) based on the L1 norm may be defined by:

```
def quantile_lossL1(q, y, f):
    # q: Quantile to be evaluated, e.g., 0.5 for me-
dian.
```

```
# y: True value.
# f: Fitted (predicted) value.
e = y - f
return np.maximum(q + e, (q - 1) * e)
``` wherein "np" stands for the numpy package.

In general, loss functions need not be limited to be based on the L1 norm. Instead, the concrete norm can be matched to the assumed noise distribution of the problem, for example as has been described in Lehtinen et al., Noise2Noise: Learning Image Restoration without Clean Data", available e.g. at arXiv:1803.04189v3 at Oct. 29, 2018, the entire contents of which are hereby incorporated herein by reference.

Figure 5:
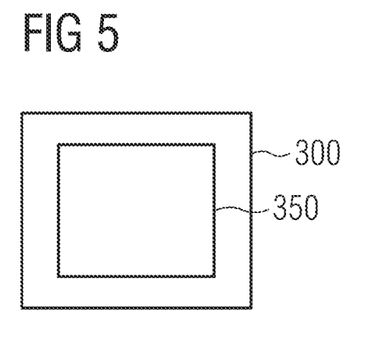
FIG. 5 shows a schematic block diagram of a system 300 according to a fourth embodiment of the present invention.

FIG. 5 shows a schematic block diagram of a system 300 according to an embodiment of the fourth embodiment of the present invention, i.e. of a system for training an artificial neural network for at least one inference task on medical input data. The system 300 comprises a computing device 350 configured to perform the method of FIG. 4.

Figure 6:
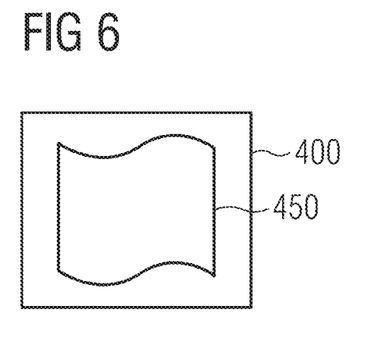
FIG. 6 shows a schematic block diagram of a storage medium according to the fifth embodiment of the present invention or according to the seventh embodiment of the present invention.

FIG. 6 shows a schematic block diagram of a non-transitory, computer-readable data storage medium according to the fifth embodiment or the seventh embodiment, i.e. a non-transitory-computer-readable data storage medium 400 comprising executable program code 450 configured to, when executed by a computing device 50, 350, perform the method according to FIG. 2 and/or the method according to FIG. 4.

Figure 7:
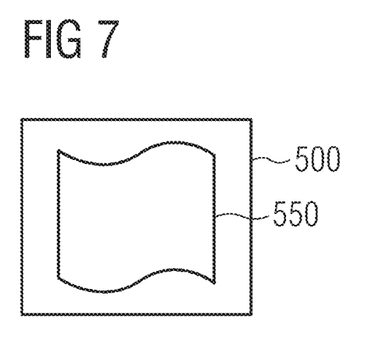
FIG. 7 shows a schematic block diagram of a computer program product according to the sixth embodiment of the present invention or according the eighth embodiment of the present invention.

FIG. 7 shows a schematic block diagram of a computer program product 500 according to the sixth embodiment or the eighth embodiment, i.e. a computer program product 500 comprising executable program code 550 configured to, when executed by a computing device 50, 350, perform the method according to FIG. 2 and/or the method according to FIG. 4.

In the foregoing detailed description, various features are grouped together in the examples with the purpose of streamlining the disclosure. It is to be understood that the above description is intended to be illustrative and not restrictive. It is intended to cover all alternatives, modifications and equivalence. Many other examples will be apparent to one skilled in the art upon reviewing the above specification, taking into account the various variations, modifications and options as described or suggested in the foregoing.

Although the invention has been illustrated and described in greater detail with reference to the referred example embodiments, the invention is not restricted thereby. Other variations and combinations can be derived herefrom by the person skilled in the art without departing from the essential concept of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A system for performing at least one inference task on medical input data, comprising:
   a computing device, configured to implement an artificial neural network (ANN), the ANN being configured to
      receive medical input data as an input, and
      perform the at least one inference task based on the medical input data received; and
   wherein the ANN comprises an output layer including, for at least one inference task of the at least one inference task, a plurality of output nodes, and
   wherein each output node of the plurality of output nodes, corresponds to one quantile out of a plurality of defined quantiles.

2. The system of claim 1, wherein the output layer includes a respective output node corresponding to each quantile, out of the plurality of defined quantiles, for each inference task of the at least one inference task.

3. The system of claim 1, wherein the ANN is configured to receive medical imaging data as the medical input data, and wherein at least one inference task, of the at least one inference task, includes classification of features of the medical imaging data into at least one of a plurality of classes.

4. The system of claim 1, wherein the plurality of defined quantiles are percentiles.

5. The system of claim 1, wherein at least one of the system and the ANN is configured to output at least one output image, and wherein output values of output nodes corresponding to different quantiles for the same inference task are indicated differently in the at least one output image.

6. A computer-implemented method for performing at least one inference task on medical input data, comprising:
   inputting medical input data into an artificial neural network (ANN), the ANN being configured to
      receive medical input data as an input, and
      perform at least one inference task based on the medical input data received;
   processing the medical input data by the ANN; and
   outputting by the ANN, for each at least one inference task of the at least one inference task, an output value respectively corresponding to each quantile of a plurality of defined quantiles.

7. The computer-implemented method of claim 6, wherein a respective output value, respectively corresponding to each quantile out of the plurality of defined quantiles, is respectively output for each inference task of the at least one inference task.

8. The computer-implemented method of claim 6, wherein medical imaging data are input as the medical input data, and wherein at least one inference task comprises classification of features of the medical imaging data into at least one of a plurality of classes.

9. A computer-implemented method for training an artificial neural network (ANN) for at least one inference task on medical input data, comprising:
providing an ANN, configured to
receive medical input data as an input and
perform at least one inference task based on the medical input data;
wherein the ANN includes an output layer with, for at least one inference task of the at least one inference task, a plurality of output nodes, and wherein each output node of the plurality of output nodes corresponds to one quantile out of a plurality of defined quantiles; and
training the ANN with labelled training data and using a cost function, including an individual loss term, for each of the defined quantiles.

10. The computer-implemented method of claim 9, wherein the individual loss terms utilize a weighted L1 norm.

11. The computer-implemented method of claim 9, wherein the cost function includes a weighted sum over the individual loss terms.

12. The computer-implemented method of claim 9, wherein the cost function penalizes when an output node corresponding to a relatively higher quantile outputs a value that is relatively lower than an output node corresponding to a relatively lower quantile for a same inference task of the at least one inference task.

13. A system for training an artificial neural network (ANN) for at least one inference task on medical input data, comprising a computing device configured to perform the computer-implemented method of claim 9.

14. A non-transitory computer-readable data storage medium storing executable program code configured to, when executed by a computing device, perform the computer-implemented method of claim 9.

15. A non-transitory computer program product storing executable program code configured to, when executed by a computing device, perform the computer-implemented method of claim 9.

16. The system of claim 2, wherein the ANN is configured to receive medical imaging data as the medical input data, and wherein at least one inference task, of the at least one inference task, includes classification of features of the medical imaging data into at least one of a plurality of classes.

17. The system of claim 2, wherein the plurality of defined quantiles are percentiles.

18. The system of claim 3, wherein the plurality of defined quantiles are percentiles.

19. The system of claim 2, wherein at least one of the system and the ANN is configured to output at least one output image, and wherein output values of output nodes corresponding to different quantiles for the same inference task are indicated differently in the at least one output image.

20. The system of claim 3, wherein at least one of the system and the ANN is configured to output at least one output image, and wherein output values of output nodes corresponding to different quantiles for the same inference task are indicated differently in the at least one output image.

21. The computer-implemented method of claim 7, wherein medical imaging data are input as the medical input data, and wherein at least one inference task comprises classification of features of the medical imaging data into at least one of a plurality of classes.

22. The computer-implemented method of claim 10, wherein the cost function includes a weighted sum over the individual loss terms.

23. The computer-implemented method of claim 10, wherein the cost function penalizes when an output node corresponding to a relatively higher quantile outputs a value that is relatively lower than an output node corresponding to a relatively lower quantile for a same inference task of the at least one inference task.

24. The computer-implemented method of claim 11, wherein the cost function penalizes when an output node corresponding to a relatively higher quantile outputs a value that is relatively lower than an output node corresponding to a relatively lower quantile for a same inference task of the at least one inference task.

\* \* \* \* \*